United States Patent [19]

Mizuta et al.

[11] Patent Number: 5,135,039
[45] Date of Patent: * Aug. 4, 1992

[54] TIRE INCLUDING STEEL TIRE CORDS

[75] Inventors: Takehiko Mizuta; Toshiaki Itoh; Hidenori Watakabe, all of Yamaguchi, Japan

[73] Assignee: Kokoku Steel Wire Ltd., Tokyo, Japan

[*] Notice: The portion of the term of this patent subsequent to Jun. 4, 2008 has been disclaimed.

[21] Appl. No.: 428,227

[22] Filed: Oct. 26, 1989

[30] Foreign Application Priority Data

Jul. 31, 1989 [JP] Japan ................................ 1-199753

[51] Int. Cl.$^5$ ............................ B60C 9/18; B60C 9/20
[52] U.S. Cl. ..................................... 152/451; 152/527
[58] Field of Search ................... 152/451, 527, 556; 57/902, 200

[56] References Cited

U.S. PATENT DOCUMENTS

| | | | |
|---|---|---|---|
| 4,333,306 | 6/1982 | Yamashita et al. | 57/206 |
| 4,715,419 | 12/1987 | Kawasaki et al. | 152/527 |
| 4,738,096 | 4/1988 | Hatakeyama et al. | 57/206 |
| 5,020,312 | 6/1991 | Watakabe | 57/902 X |

FOREIGN PATENT DOCUMENTS 62-282923  12/1987  Japan ................................. 152/527

*Primary Examiner*—Michael W. Ball
*Assistant Examiner*—Adrienne C. Johnstone
*Attorney, Agent, or Firm*—Klauber & Jackson

[57] ABSTRACT

A tire formed of steel tire cords, in which each steel tire cord is provided with five strands of steel cords extending in the longitudinal direction and being twisted together, the strands being embedded in a belt layer, and only two of the strands extending in a zig-zag manner along the longitudinal direction thereof so as to form sharp angles therealong, the sharp angles of the different strands being in alignment with each other.

5 Claims, 2 Drawing Sheets

TIRE INCLUDING STEEL TIRE CORDS

BACKGROUND OF THE INVENTION

The present invention relates to a tire, and particularly to a tire which is incorporated therein with newly developed steel cords having opened parts, and which has a uniform quality and an excellent durability and as well has a satisfactory workability upon molding.

DESCRIPTION OF THE PRIOR ART

A conventional tire has open-twisted steel cords which are embedded in a belt layer and which provide excellent in penetration by rubber in comparison with unopen-twisted steel cords.

However, the above-mentioned open-twisted steel cords have unstable twist in the longitudinal direction thereof.

The above-mentioned unstable twist is caused by an inferior workability during a topping step. Accordingly, these open-twisted steel cords are expensive while raising the problem of imparting non-uniform qualities to the belt layer. Further, stress is unevenly distributed in only one or two strands in a steel cord, which are therefore broken in an extremely early stage, causing a problem in durability.

SUMMARY OF THE INVENTION

The present invention is devised in view of the above-mentioned matters, and accordingly, one object of the present invention is to provide a tire having a uniform quality and an excellent durability by using steel cords which are stable in twisted shape in the longitudinal direction and which have a high rubber penetration.

To this end, according to a first aspect of the present invention, there is provided a tire in which steel cords extending in more than three strands twisted together and having a longitudinal direction are embedded in a belt layer, characterized in that each of steel cords comprises open-structure sections having gaps between at least part of the above-mentioned strands, and closed-structure sections having no gaps between the above-mentioned strands and having more than one twist pitch length, the above-mentioned open-structure sections and the above-mentioned closed-structure sections being alternately arranged in the above-mentioned longitudinal direction, and a ratio between the length of the above-mentioned closed-structure sections and the sum of the above-mentioned open-structure sections and the above-mentioned closed-structure sections is 20 to 80%.

More specifically, one of the closed-structure sections in the steel cord having less than one twist pitch length of the steel cord, or the ratio of the length thereof with respect to the sum of the lengths of the open-structure sections and the closed-structure sections having less than 20% are inappropriate since a longitudinal shift or a slip is likely to occur. Meanwhile the ratio of the length having more than 80% is also practically inappropriate since it exceeds a practical range in which no rubber penetrates in the steel cord, and accordingly, the binding strength between rubber and strands is insufficient. Further, in such an arrangement, substantially no rubber penetrates into the center cavity of the steel cord in the closed-structure sections although a bit of rubber penetrated into the center cavity laterally thereof.

Further, although the open-structure sections and the closed-structure sections are alternately arranged in the steel cord, the ratio of the length of the closed-structure sections is selected within the range of 20 to 80%. Further, the relationship between the lengths of the open-structure sections and the closed-structure sections is not subjected to a limitation but is free. For example, such a configuration can be taken that the open-structure sections have plural pitch lengths, and the closed-structure sections have one pitch length, that both open-structure sections and closed-structure sections have more than one pitch length, that the open-structure sections have one pitch length and the closed-structure sections have plural pitch lengths, and so forth. Further, gaps may be formed between adjacent parts of the strands in each of open-structure sections of the steel cord, or between all strands of the steel cord.

Further, according to a second aspect of the present invention, there is provided a tire in which steel cords each having more than three strands twisted together and having a longitudinal direction are embedded in a belt layer characterized in that more than one of said strands is formed with substantially zig-zagging or bent marked parts along said longitudinal direction.

Further, it is preferable to have more than 0.05 mm of gaps between the strands due to the provision of the above-mentioned marked parts.

Further, the relationship between the pitch lengths of the marked parts and the twist pitch lengths of the strands may be arbitrary. However, the pitch lengths of the marked parts preferably is more than 2 mm but less than two times as large as the twist pitches of the strands. If the pitche lengths of the marked parts is less than 2 mm, it is difficult to hold the gaps having more than 0.05 mm, while if the pitche length is more than twice as large as the twist pitches of the strands, intervals of parts through which rubber penetrates exceeds the twist pitches of the strands.

Further, in such a case that the steel cord has more than two strands having the marked parts, the marked parts of the strands may have an arbitrary configuration, and accordingly, they are aligned together in the longitudinal direction so as to be adjacent to each other in the circumferential direction, or they are shifted from each other in the longitudinal direction so as not to be adjacent to each other in the circumferential direction.

The number of the strands in each steel cord is suitably selected more than three.

In view of the first aspect of the invention, in the closed-structure sections, the strands make contact with each other with no gaps, exceeding one pitche length and in the length of 20 to 80% of the sum of the lengths of the closed-structure sections and the open-structure sections so as to restrain themselves from shifting and slipping, and this restraining force for the shifting and slipping of the strands can stably hold a satisfactory twist condition in the longitudinal direction.

Further, in view of the second aspect of the present invention, the gaps are formed between the marked parts and the strands or between the marked parts themselves, which are adjacent to each other in the circumferential direction, but the strands make close contact with each other with no gaps therebetween in the other sections so as to restrain themselves from shifting or slipping and, thereby it is possible to hold a stable twist condition in the longitudinal direction.

BRIEF DESCRIPTION OF THE DRAWINGS

The present invention and its purposes and advantages will be more readily apparent and appreciated from the following detailed description taken in conjunction with the accompanying drawings in which.

DESCRIPTION OF THE PREFERRED EMBODIMENTS

Figure 1:
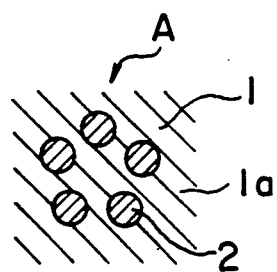
FIG. 1 is a partial sectional view illustrating one embodiment of a tire of the first aspect of the present invention.

Referring to FIG. 1 in which a tire (A) having a desired shape in one embodiment of the first aspect of the present invention is shown, steel cords 2 are embedded in a belt layer 1.

Each steel cord 2 composed of five strands 3 twisted together, has open-structure sections 2a and closed-structure sections 2b which are alternately laid in the longitudinal direction, the strands 3 defining therebetween gaps 4 communicated with a center cavity 5 of the steel cord in the opened-structure sections while they make contact with each other with no gaps in the closed-structure sections, having a ratio 33% in the length of the closed-structure sections with respect to the sum of the lengths of the open-structure sections and the closed-structure sections.

Figure 2:
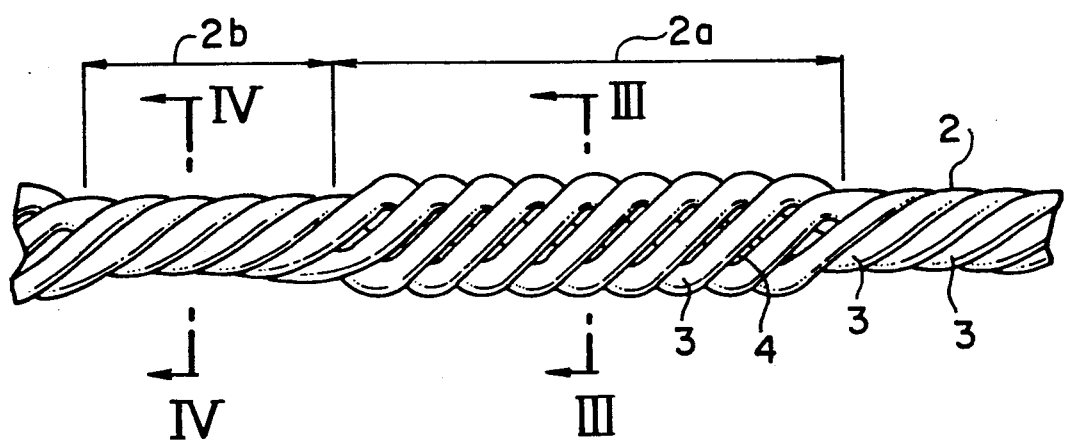
FIG. 2 is a partial plan view illustrating a tire steel cord used in the tire shown in FIG. 1.
Figure 3:
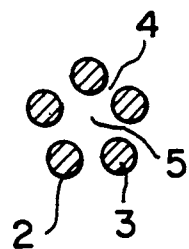
FIG. 3 is a transverse-sectional view along line III—III in FIG. 2.
Figure 4:
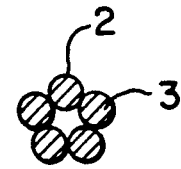
FIG. 4 is a transverse-sectional view along line II—II in FIG. 2.

Further, the open-structure sections are formed with steep marked parts of the strands 3 in these sections while the closed-structure sections are formed with weak marked sections of the strands of these sections. Further, the open-structure sections 2a and the close-structure sections 2b are alternately arranged in the longitudinal direction with such a relationship that the open-structure section have two pitch lengths while the closed-structure sections have one pitch lengths (refer to FIGS. 2 to 4).

Rubber 1a penetrates in the open-structure sections 2a of the steel cord 2 so as to be filled in the gaps 4 and the center cavity 5.

Figure 5:
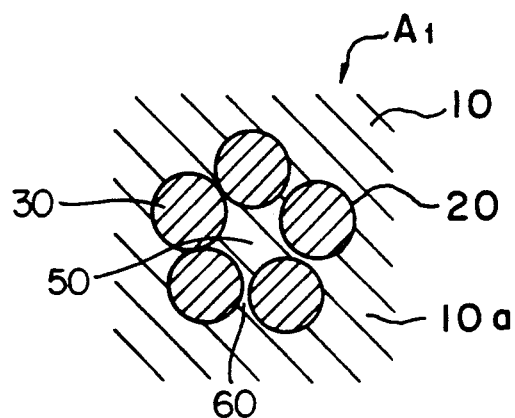
FIG. 5 is a partial cross-sectional view illustrating one embodiment of a tire of the second aspect of the present invention.

Referring to FIG. 5 in which a tire $A_1$ according to the second aspect of the present invention is shown, having a desired shape, steel cords 20 are embedded in the belt layer 10.

As shown in FIG. 5, each steel cord 20 has five strands 30 twisted together, two of the strands are formed therein with substantially zig-zagging or bent marked parts 40 which form gaps 60 between the strands, and being in communication with the center cavity 50 of the steel cord, the strands in the other parts of the marked parts making close-contact with each other with no gaps. As shown in FIG. 5, each bent part 40 of the two zig-zag strands are in alignment with each other.

Rubber 10a penetrates in the steel cord 20 so as to be filled in gaps 60 at the positions of the marked parts 40 and the center cavity 50.

Figure 6:
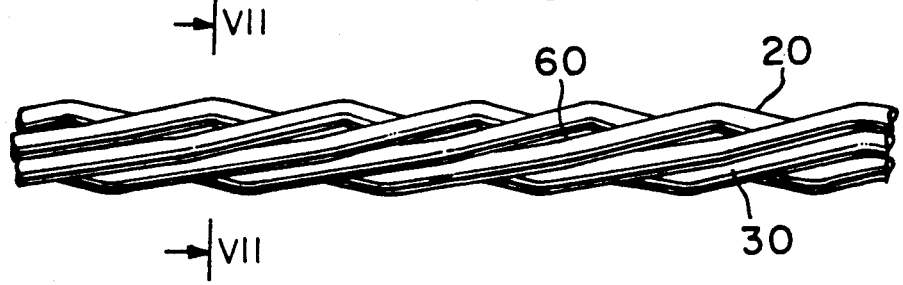
FIG. 6 is a partial plan view illustrating a steel cord of another embodiment of a tire of the second aspect of the present invention.
Figure 7:
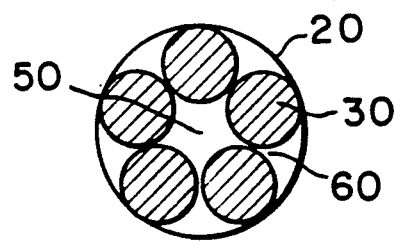
FIG. 7 is an enlarged transverse-sectional view along VII—VII line in FIG. 6.
Figure 8:
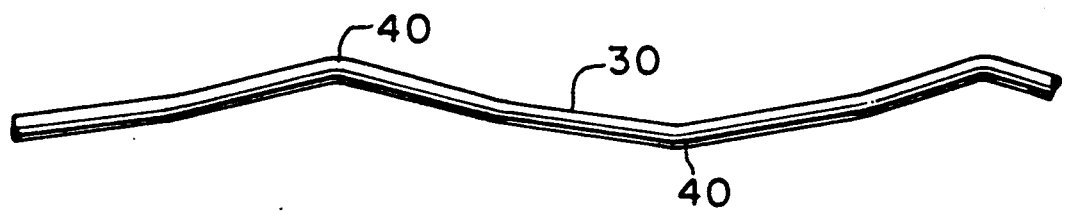
FIG. 8 is a plan view illustrating a strand in the steel cord shown in FIG. 6.

Alternatively, as shown in FIG. 6, all of the strands are twisted in a zig-zag manner, with the bent parts 40 shifted downstream from each other. As a result, only one bent part 40 is provided at any position for providing a gap to receive the rubber, while the other four strands are tightly closed, as shown in FIG. 7.

The following table shows stabilities in twist and initial elongations of the steel cords 2, 20 in the tires A, $A_1$ according to the present invention, in comparison with a conventional open steel cord as a comparison example, in which I indicates a steel cord basically identical with the steel cord 2 while II indicates a steel cord basically identical with the steel cord 20.

TABLE

|  | COMPARISON EXAMPLE | INVENTION I | INVENTION II |
| --- | --- | --- | --- |
| STRUCTURE | 1 × 4 × 2.8 mm | 1 × 4 × 0.28 mm | 1 × 4 × .28 mm |
| PITCHES | 12.5 mm | 12.5 mm | 12.5 mm |
| STABILITY IN TWISTING | INFERIOR | SUPERIOR | SUPERIOR |
| INITIAL ELONGATION |  |  |  |
| 0.25 to 2 kg | 0.375% | 0.18% | 0.05% |
| 0.25 to 5 kg | 0.5% | 0.28% | 0.135% |

As understood from the above table, the stabilities in twisting of the steel cords according to the present invention are satisfactory in comparison with that of the comparison example, and further, the initial elongations thereof are less than one half of that of the comparison example. Further, the penetration of rubber in the steel cord according to the present invention was found to be also satisfactory, which was particularly satisfactory in the steel cord II according to the invention.

Accordingly, the present invention gives the following advantages:

(1) since the steel cord has a stable twist and a less initial elongation, the workability in a topping process step is high and therefore it is economically advantageous;

(2) since no stress is unevenly distributed to specific strands due to a stable twist in the longitudinal direction, no specific strands are broken in an early stage, and thereby it has a high durability;

(3) since the penetration of rubber is satisfactory, it is possible to prevent the steel cord from being corroded; and (4) since steel cords which are produced in an appropriate manufacturing process and have a stable twist are embedded, it is possible to provide tires having a quality which is uniform without a large deviation.

What is claimed is:

1. A tire including steel tire cords, each steel tire cord comprising more than three strands of cords extending in a longitudinal direction and being twisted together, said strands being embedded in a belt layer, at least two of said strands extending in a zig-zag manner along the longitudinal direction thereof so as to form sharp angles therealong, said sharp angles in different ones of said strands being offset with respect to each other.

2. A tire according to claim 1, wherein all of the strands of each said steel tire cord extend in said zig-zag manner, and the sharp angles in all of the strands are offset with respect to each other.

3. A tire including steel tire cords, each steel tire cord comprising more than three strands of cords extending in a longitudinal direction and being twisted together, said strands being embedded in a belt layer, and at least two of said strands extending in a zig-zag manner along the longitudinal direction thereof so as to form sharp angles therealong, said sharp angles of the different strands being in alignment with each other.

4. A tire according to claim 3, wherein each said steel tire cord includes more than two strands, with only two strands extending in said zig-zag manner.

5. A tire according to claim 4, wherein each said steel tire cord includes five strands, with only two strands extending in said zig-zag manner.

* * * * *